United States Patent
Wilczewska et al.

(10) Patent No.: US 7,109,276 B2
(45) Date of Patent: Sep. 19, 2006

(54) METHOD FOR FREE RADICAL REDUCTION OF DITHIOCARBONYLATED OR DITHIOPHOSPHORYLATED FUNCTIONS BORNE BY A POLYMER

(75) Inventors: Zofia Agnieszka Wilczewska, Bialystok (PL); Mathias Destarac, Paris (FR); Samir Zard, Gif-sur-Yvette (FR); Chakib Kalai, Paris (FR); Gérard Mignani, Lyons (FR); Hervé Adam, Princeton, NJ (US)

(73) Assignee: Rhodia Chimie, Boulogne-Billancourt Cedex (FR)

( * ) Notice: Subject to any disclaimer, the term of this patent is extended or adjusted under 35 U.S.C. 154(b) by 171 days.

(21) Appl. No.: 10/475,614

(22) PCT Filed: May 3, 2002

(86) PCT No.: PCT/FR02/01537

§ 371 (c)(1),
(2), (4) Date: Oct. 22, 2003

(87) PCT Pub. No.: WO02/090397

PCT Pub. Date: Nov. 14, 2002

(65) Prior Publication Data

US 2004/0122193 A1    Jun. 24, 2004

Related U.S. Application Data

(60) Provisional application No. 60/288,846, filed on May 4, 2001, provisional application No. 60/288,844, filed on May 4, 2001.

(30) Foreign Application Priority Data

Sep. 5, 2001   (FR) .................................. 01 11496

(51) Int. Cl.
*C08F 4/44*        (2006.01)
(52) U.S. Cl. .................. 526/140; 526/140; 526/317.1; 524/115; 524/134; 524/137; 528/390

(58) Field of Classification Search ................ 525/241, 525/144, 260, 261, 333; 524/115, 134, 137; 526/140, 317.1; 528/390
See application file for complete search history.

(56) References Cited

U.S. PATENT DOCUMENTS

| | | | | |
|---|---|---|---|---|
| 2,996,492 | A | * | 8/1961 | Tegge et al. .................. 526/84 |
| 3,580,830 | A | * | 5/1971 | Siebert .................. 204/157.71 |
| 4,680,381 | A | * | 7/1987 | Asada et al. ................. 528/501 |
| 5,480,921 | A | * | 1/1996 | Hunter et al. ............... 523/331 |
| 6,120,780 | A | * | 9/2000 | Dupuis et al. .............. 424/401 |
| 6,437,040 | B1 | * | 8/2002 | Anthony et al. ............ 524/505 |
| 6,512,081 | B1 | * | 1/2003 | Rizzardo et al. ............ 528/340 |
| 6,518,364 | B1 | * | 2/2003 | Charmot et al. ............ 525/259 |
| 6,642,318 | B1 | * | 11/2003 | Chiefari et al. ............. 525/261 |
| 6,919,409 | B1 | * | 7/2005 | Charmot et al. ............ 525/259 |
| 2004/0024132 | A1 | * | 2/2004 | Chiefari et al. ............. 525/261 |

FOREIGN PATENT DOCUMENTS

| | | | |
|---|---|---|---|
| EP | 0 084 882 A | | 8/1983 |
| EP | 0 189 672 A | | 8/1986 |
| EP | 0 243 124 A | | 10/1987 |
| EP | 0 849 282 A | | 6/1998 |
| FR | 2 794 464 A | | 12/2000 |
| WO | WO 99/31144 | * | 6/1999 |
| WO | WO 00 20465 A | | 4/2000 |
| WO | WO 01 42312 A | | 6/2001 |

* cited by examiner

*Primary Examiner*—David W. Wu
*Assistant Examiner*—M. Bernshteyn
(74) *Attorney, Agent, or Firm*—Buchanan Ingersoll & Rooney, PC

(57) ABSTRACT

The invention concerns a method for preparing a polymer, comprising a step which consists in contacting: (A) at least a living organic polymer having at its chain end a dithiocarbonylated or dithiophosphorylated function capable of being reactivated; (B) at least a source of free radicals; and (C) at least an organic compound bearing a labile hydrogen atom, whereby the dithiocarbonylated or dithiophosphorylated function present on said living organic polymer is substituted by a hydrogen atom.

12 Claims, No Drawings

METHOD FOR FREE RADICAL REDUCTION OF DITHIOCARBONYLATED OR DITHIOPHOSPHORYLATED FUNCTIONS BORNE BY A POLYMER

This application claims priority under 35 U.S.C. § 119 to Provisional Application No. 60/288,844, filed in the United States on May 4, 2001 and to Provisional Application No. 60/288,846, filed in the United States on May 4, 2001, the entire contents of which are hereby incorporated by reference.

The present invention relates to a process for the radical reduction of dithiocarbonyl or dithiophosphoryl functional groups carried by a polymer resulting from a living radical polymerization which gives rise in particular to polymers possessing controlled architecture and in particular to block copolymers not exhibiting such dithiocarbonyl or dithiophosphoryl functional groups.

In the present description, unless otherwise indicated, the term "polymer" will be used to denote, in the broad sense, both homopolymers and copolymers. The polymers can correspond to polymers (homopolymers) or copolymers (random, diblock, triblock, grafted or star, or hyperbranched).

More specifically, within the meaning of the invention, the term "polymer possessing controlled architecture" is understood to mean a polymer based on two or more monomers exhibiting a controlled arrangement of these various monomer units constituting it.

The term "block polymer" is understood to denote, according to the invention, a copolymer comprising at least two successive sequences (blocks) of monomer units with different chemical constitutions. Each of the blocks present can be composed of a homopolymer or of a copolymer obtained from a mixture of ethylenically unsaturated monomers. In the second case, the block can in particular be a random copolymer. The block copolymers within the meaning of the invention can thus comprise two blocks each composed of random copolymers. In this case, the ethylenically unsaturated monomers are such that the blocks obtained are of different natures. The term "blocks of different natures" is understood to mean either blocks composed of monomers of different types or blocks composed of monomers of the same type but in different amounts.

Polymers possessing controlled architecture, such as block polymers, are usually prepared by ionic polymerization. This type of polymerization exhibits the disadvantage, however, of only making possible the polymerization of certain types of nonpolar monomers, such as styrene and butadiene. Furthermore, ionic polymerization generally requires severe processing restrictions and in particular a reaction medium which is particularly devoid of impurities and processing temperatures which are often below ambient temperature, so as to minimize the appearance of side reactions.

Such restrictions do not exist in the case of radical polymerization, which additionally exhibits the advantage of being able to be employed in the context of the polymerization of other types of monomers. For this reason, interest was quickly displayed in radical polymerization in the context of the preparation of polymers possessing controlled architecture of the type of block copolymers.

However, during a conventional radical polymerization reaction, the growing macroradicals generally have a nonselective reactivity and the chains generally end irreversibly by coupling or disproportionation. Consequently, in radical polymerization, it is generally very difficult to control the structure of the chains produced and it is in particular extremely difficult to produce polymers functionalized at the chain end, which limits, in the most general case, the possibilities of obtaining block copolymers.

To overcome difficulties of this type, specific radical polymerization processes have recently been developed in which the growing polymer chains and the chains produced in fine are functionalized by end groups capable of being able to be reactivated in the form of free radicals by virtue of reversible termination or transfer reactions.

This type of specific radical polymerization is generally denoted by the term of "controlled" or "living" radical polymerization. These names originate from the fact that the presence of the reactivatable end groups described above results in the existence of equilibria between functionalized entities (referred to as "dormant" entities) and active entities (free radicals) which makes it possible simultaneously to control the growth of the polymer chains (achievement of narrow mass distributions and control of the average molecular mass, in particular by varying the molar ratio of monomer to precursor of active chains) and to obtain functionalized polymers, referred to as "living" polymers, that is to say polymers capable of being employed as reactivatable entities in subsequent radical polymerization reactions, which proves to be particularly advantageous in the context of the preparation of block copolymers. For further details on this subject, reference may be made in particular to K. Matyjaszewski, Editor, Controlled Radical Polymerization, ACS Symposium Series 685, American Chemical Society, Washington, D.C., 1998 and ACS Symposium Series 768, 2001.

Living (or controlled) radical polymerization ideally exhibits the following distinctive aspects:

1. a fixed number of chains throughout the duration of the reaction;

2. a rate of growth tightly constrained around a mean value for all the growing polymer chains and advantageously an identical rate of growth for all the chains, which is reflected by:

an increase in the molecular masses with the conversion, advantageously in a linear fashion; and a narrow distribution of the masses;

3. the possibility of controlling the average molecular mass by the molar ratio of monomer to chain precursor.

In this context, many controlled (living) polymerization processes, referred to as "reversible chain-transfer" processes, employing addition-fragmentation mechanisms have been developed in particular. This specific polymer synthesis is performed by carrying out a radical polymerization, generally initiated thermally, in the presence of reversible transfer agents and of a source of free radicals, which results in the production of functionalized polymers. This type of polymerization is one of the most appropriate technologies for synthesizing block copolymers by the radical route.

For more teaching regarding polymerizations of this type by reversible addition-fragmentation transfer, reference may be made, for example, to patent applications WO 98/01478 or WO 99/35178, which disclose the use of reversible transfer agents of dithioester type of RS(C=S)R' type for the synthesis of copolymers possessing controlled architecture. The use of dithiocarbamate transfer agents of RS(C=S)NR'R" type for controlling radical polymerizations has also been disclosed in patent applications WO 99/35177 or WO 99/31144. Still as regards this type of reversible transfer polymerization, a process for the preparation of silicone/organic hybrid copolymers by radical polymerization under thermal activation has also been disclosed in French patent application FR 00/09722, filed by the applicant company on Jul. 25, 2000. These hybrid copolymers are composed of a silicone backbone and carriers of organic groups. They are prepared from a silicone precursor, from at least one ethylenically unsaturated organic monomer and from a radical polymerization initiator. In the context of the living radical polymerization by thermal initiation, the xanthates of general formula RSC(=S)OR', disclosed, for example, in patent applications WO 98/58974, WO 00/75207 and WO 01/042312, are particularly advantageous reversible transfer agents which make it possible to control the radical polymerization of a good number of monomers, such as styrene, acrylic, acrylamide, vinyl ester and diene monomers.

Whatever the exact method of carrying out a living radical polymerization reaction, the polymer chains obtained on conclusion of such a reaction are generally functionalized at the chain end. This functionalization generally confers on them an effective "living" nature, that is to say that they can act as reactivatable entities in subsequent polymerization reactions, which proves to be particularly advantageous in carrying out the synthesis of polymers possessing controlled architecture and in particular of block copolymers. However, generally, the reactivatable functional groups present at the chain end on the polymers obtained on conclusion of a living radical polymerization are also unstable and they are, for example, often hydrolyzable in a basic medium. These hydrolysis reactions are capable of releasing byproducts of low molecular weight which are malodorous and/or toxic to the environment and man, such as, for example, carbonyl sulfide in the case of polymers exhibiting reactivatable functional groups of xanthate type.

One of the aims of the present invention is to provide a process which makes it possible to remove the reactive functional groups carried by some polymers resulting from a living polymerization reaction.

Another aim of the invention is to provide a process for the preparation of polymers having the advantages presented by polymers resulting from a living radical polymerization reaction, namely, in particular, a well controlled number-average molecular mass $M_n$ and a narrow distribution of masses, but not exhibiting reactivatable functional groups at the chain end capable of leading to the above-mentioned disadvantages.

These aims and others which will become apparent in the light of the description are achieved by the present invention, a subject matter of which is a process for the preparation of a polymer which comprises a stage consisting in bringing into contact:

(A) at least one living organic polymer exhibiting, at the chain end, at least one reactivatable dithiocarbonyl or dithiophosphoryl functional group;

(B) at least one source of free radicals; and (C) at least one organic compound carrying a labile hydrogen atom.

This stage makes it possible more particularly to substitute the dithiocarbonyl or dithiophosphoryl functional group present on said living organic polymer by a hydrogen atom.

The term "living organic polymer" is understood to mean, within the meaning of the present description, any polymer within the meaning of the invention at least partially based on organic monomer units and capable of being obtained according to a living radical polymerization process.

The living organic polymers which are employed in the process of the invention can advantageously be copolymers possessing controlled architecture and they can thus be, for example, block copolymers. Whatever their exact structure, these living organic polymers specifically exhibit, at the chain end, at least one reactivatable dithiocarbonyl or dithiophosphoryl functional group, that is to say a functional group respectively of —S(C=S)—R or —S(P=S)—R type, where R denotes any organic group.

Thus, the reactivatable dithiocarbonyl or dithiophosphoryl functional group present at the chain end on the polymer (A) employed in the process of the invention can advantageously be an —S(C=S)—R or —S(P=S)—R functional group, where R denotes:

(i) an alkyl, haloalkyl, perfluoroalkyl, alkenyl, alkynyl, acyl, aryl, arylalkyl, arylalkenyl or arylalkynyl group, or else a carbonaceous ring or a heterocycle, or else a polymer chain;

(ii) an —OR$^a$ radical, in which R$^a$ denotes a group selected from:

an alkyl, haloalkyl, perfluoroalkyl, alkenyl, alkynyl, acyl, aryl, arylalkyl, arylalkenyl or arylalkynyl group, or else a carbonaceous ring or a heterocycle, or else a polymer chain;

a —CR$^b$R$^c$PO(OR$^d$)(OR$^e$) group, in which:

R$^b$ and R$^c$ each represent, independently of one another, a hydrogen atom, a halogen atom, a perfluoroalkyl group, a carbonaceous ring or a heterocycle, or else an —NO$_2$, —NCO or —CN group or a group selected from the groups of —R$^f$, —SO$_3$R$^f$, —OR$^f$, —SR$^f$, —NR$^f$R$^g$, —OOCR$^f$, —CONR$^f$R$^g$ or —SO$_3$R$^f$ type, in which R$^f$ and R$^g$ each independently denote an alkyl, alkenyl, alkynyl, aryl, aryl, arylalkyl, arylalkenyl or arylalkynyl group;

or else R$^b$ and R$^c$ form, together with the carbon to which they are attached, a C=O or C=S group, or else a hydrocarbonaceous ring or a heterocycle; and R$^d$ and R$^e$ each represent, independently of one another, a radical corresponding to one of the definitions given above for the R$^f$ group;

or else R$^d$ and R$^e$ together form a hydrocarbonaceous chain comprising from 2 to 4 carbon atom optionally interrupted by an —O—, —S— or —NR$^h$- group, where R$^h$ corresponds to one of the definitions given above for the R$^f$ group;

(iii) an —NR$^i$R$^j$ group, where:

R$^i$ and R$^j$ represent, independently of one another, a radical selected from an alkyl, haloalkyl, alkenyl, alkynyl, acyl, ester, aryl, arylalkyl, arylalkenyl or arylalkynyl group or a carbonaceous ring; or R$^i$ and R$^j$ together form a hydrocarbonaceous chain comprising from 2 to 4 carbon atom optionally interrupted by an —O—, —S— or —NR$^H$-group, where R$^H$ corresponds to one of the definitions given above for the R$^f$ group, said hydrocarbonaceous chain advantageously forming a 5-membered ring with nitrogen to which R$^i$ and R$^j$ are attached, the R$^i$ and R$^j$ radicals preferably inducing an electron-withdrawing effect or a delocalization effect with regard to the electron density of the nitrogen atom to which they are bonded.

Throughout the present description, the term "alkyl" group is intended to cover a saturated, linear or branched, hydrocarbonaceous radical which can optionally include one or more saturated aliphatic ring(s). Within the meaning of the invention, the alkyl groups can exhibit up to 25 carbon atoms and they preferably comprise from 1 to 12 carbon atoms and advantageously from 1 to 6 carbon atoms.

Specifically, an alkyl group can also denote, within the meaning of the invention, a cycloalkyl group, that is to say a saturated cyclic hydrocarbonaceous radical, preferably exhibiting from 3 to 10 carbon atoms.

For its part, an "alkoxy" group denotes, within the meaning of the invention, an —OAlk radical, where Alk denotes an alkyl group as defined above.

The term "haloalkyl" group within the meaning of the invention is intended to denote an alkyl radical as defined above which is substituted by at least one halogen atom, where the term "halogen atom" denotes here, as throughout the description, a fluorine, chlorine, bromine or iodine atom, preferably a fluorine or chlorine atom and advantageously a fluorine atom. The "haloalkyl" groups of the invention can thus be, for example, "perfluoroalkyl" groups, that is to say, within the meaning of the invention, groups corresponding to the formula —$CH_2C_nF_{2n+1}$, where n represents an integer ranging from 1 to 20.

Furthermore, an "alkenyl" group, with the meaning employed in the present description, denotes an unsaturated, linear or branched, hydrocarbonaceous radical exhibiting at least one C=C double bond. The alkenyl groups of the invention can exhibit up to 25 carbon atoms and preferably comprise from 2 to 12 carbon atoms and advantageously from 2 to 6 carbon atoms.

Likewise, the term "alkynyl" group is intended to mean an unsaturated, linear or branched, hydrocarbonaceous radical exhibiting at least one C≡C triple bond. The alkynyl groups of the invention generally exhibit from 2 to 25 carbon atoms and they preferably comprise from 2 to 15 carbon atoms and advantageously from 2 to 6 carbon atoms.

For its part, an "acyl" group denotes, within the meaning of the invention, a group of formula —C(=O)—B where B denotes a saturated or unsaturated, linear or branched, hydrocarbonaceous chain comprising from 1 to 25 carbon atoms which can in particular be an alkyl, alkenyl or alkynyl group as defined above.

The term "ester" group is intended to mean, within the meaning of the invention, a —C(=O)—OB group, where B denotes a saturated or unsaturated, linear or branched, hydrocarbonaceous chain comprising from 1 to 25 carbon atoms which can in particular be an alkyl, alkenyl or alkynyl group as defined above.

Within the meaning of the invention, a radical of "carbonaceous ring" type denotes a saturated, unsaturated or aromatic cyclic group, in particular of cycloalkyl, cycloalkenyl or cycloalkynyl type, which is optionally substituted and which comprises from 3 to 20 carbon atoms. A radical of "heterocycle" type denotes, for its part, such a carbonaceous ring interrupted by at least one heteroatom selected, for example, from N, O or S.

For its part, an "aryl" group denotes, within the meaning of the invention, a mono- or polycyclic aromatic group generally having from 5 to 20 carbon atoms and preferably from 6 to 10 carbon atoms. Thus, it can, for example, be a phenyl group or a 1- or 2-naphthyl group. According to a specific alternative form, an "aryl" group within the meaning of the invention can incorporate one or more heteroatoms, such as sulfur, oxygen or nitrogen. In this specific case, the "aryl" group within the meaning of the invention denotes a mono- or polycyclic heteroaromatic group.

The "arylalkyl", "aralkenyl" and "aralkynyl" groups within the meaning of the invention are respectively alkyl, alkenyl and alkynyl chains substituted by an aryl group as defined above. In other words, the "arylalkyl", "aralkenyl" and "aralkynyl" groups within the meaning of the invention are respectively groups of Ar—Ra— type in which Ar— represents an aryl group and where the groups of —Ra-type respectively represent an alkylene, alkenylene or alkynylene chain.

The various radicals can optionally be interrupted by one or more heteroatoms selected in particular from O, S, N and Si or by —(C=O)—, —(C=S)—, —$SO_2$—, —SO— or secondary or tertiary amine groups and they can be substituted by groups of any type not capable of interfering with the polymerization reaction or of leading to side reactions between the compounds which have been brought together and in particular by one or more identical or different groups selected from a halogen atom, a silyl group or an —OH, alkoxy, —SH, thioalkoxy, —$NH_2$, mono- or dialkylamino, —CN, —COOH, ester, amine or perfluoroalkyl group, it being possible for said substituents optionally to be interrupted by heteroatoms. It is within the competence of a person skilled in the art to select the nature of the various groups and substituents present in the compounds employed in order to avoid any undesirable secondary reaction.

The living organic polymer (A) employed in the process of the invention is preferably a polymer resulting from a process employing a living radical polymerization using reversible addition-fragmentation transfer agents, of dithioester, xanthate, dithiocarbamate, thioether-thione, trithiocarbonate or dithiophosphoric ester type, and which exhibits, at at least one end of its chain, a reactivatable dithiocarbonyl or dithiophosphoryl part originating from these reversible transfer agents.

The living organic polymers (A) used in the process of the invention can, for example, be polymers resulting from a controlled radical polymerization process carried out by bringing into contact one or more ethylenically unsaturated monomer(s), at least one source of free radicals and at least one reversible transfer agent of the abovementioned type. More specifically, the living organic polymers used in the process of the invention can be block polymers resulting from a copolymerization process comprising N successive stages of radical polymerizations (N being greater than or equal to 2), the first of these stages being a controlled radical polymerization carried out by bringing into contact one or more ethylenically unsaturated monomer(s), at least one source of free radicals and at least one reversible transfer agent of the abovementioned type and the following (N−1) stages being controlled radical polymerizations carried out by bringing into contact one or more ethylenically unsaturated monomer(s) different from those of the preceding stage, at least one source of free radicals and the living polymer composition resulting from the preceding stage.

Thus, the living organic polymers (A) used in the process of the invention can advantageously be polymers resulting from a copolymerization process selected, for example, from the processes disclosed in patent applications WO 98/01478 and WO 99/35178, which employ reversible transfer agents of dithioester or dithiocarbamate type, or from the processes of patent applications WO 98/58974, WO 00/75207 and WO 01/042312, employing reversible transfer agents of xanthate type. They can also be polymers obtained according to one of the processes disclosed in patent applications WO 99/35177 or WO 99/31144, which use reversible transfer agents of dithiocarbamate type, or alternatively according to the process disclosed in patent application FR 2 794 464, which employs reversible transfer agents of thioether-thione type.

According to a specific embodiment of the invention, the living organic polymers (A) used in the process of the invention can also result from the process employing reversible transfer agents of dithiophosphoric ester type of the type of that which was disclosed in French patent application No. 00/09952, filed on Jul. 28, 2000 by the applicant company, that is to say according to a process comprising at least one stage of radical polymerization of a composition comprising:

at least one ethylenically unsaturated monomer
a source of free radicals, and
at least one compound of dithiophosphoric ester type of general formula (F):

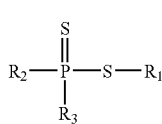

(F)

in which:
$R_1$ represents:
an alkyl, acyl, aryl, aralkyl, alkene or alkyne group, preferably an alkyl group, which is advantageously substituted,
an optionally substituted and aromatic, saturated or unsaturated, carbonaceous ring or heterocycle,
a polymer chain, for example resulting from a radical or ionic polymerization or from a polycondensation,
$R_2$ and $R_3$, which are identical or different, represent:
a hydrogen atom,
—S—$R_4$, where $R_4$ has one of the meanings given above for $R_1$,
an optionally substituted alkyl, acyl, aryl, aralkyl or alkyne radical,
an optionally substituted, aromatic, saturated or unsaturated, carbonaceous ring or heterocycle;
or else $R_2$ and $R_3$ together represent the atoms necessary to form an optionally substituted, aromatic, saturated or unsaturated, carbonaceous ring or heterocycle; and
p is between 2 and 10, it being possible for the $R_1$, $R_2$ and $R_3$ groups to be substituted, preferably by optionally substituted phenyl groups, optionally substituted aromatic groups, saturated or unsaturated carbonaceous rings, saturated or unsaturated heterocycles, or alkoxycarbonyl or aryloxycarbonyl (—COOR), carboxyl (—COOH), acyloxy (—$O_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidino, hydroxyl (—OH), amino (—NR$_2$), halogen, perfluoroalkyl $C_nF_{2n+1}$, allyl, epoxy, alkoxy (—OR), S-alkyl or S-aryl groups, groups exhibiting a hydrophilic or ionic nature, such as alkaline salts of carboxylic acids, sulfonic acid alkaline salts, poly(alkylene oxide) chains (of poly(ethylene oxide) or poly(propylene oxide) type), cationic substituents (quaternary ammonium salts), R representing an alkyl or aryl group, or a polymer chain.

The optionally substituted alkyl, acyl, aryl, aralkyl or alkyne groups present in the dithiophosphoric esters of formula (F) generally have from 1 to 20, advantageously from 1 to 12 and more preferably from 1 to 9 carbon atoms. They can be linear or branched. They can also be substituted by oxygen atoms, in particular in the form of esters, or sulfur or nitrogen atoms.

Mention may in particular be made, among the alkyl radicals which can be envisaged, of the methyl, ethyl, propyl, butyl, pentyl, isopropyl, tert-butyl, pentyl, hexyl, octyl, decyl or dodecyl radical.

Mention may in particular be made, among aryl radicals, of the optionally substituted phenyl radical, in particular substituted by a nitro or hydroxyl functional group.

Mention may in particular be made, among aralkyl radicals, of the optionally substituted benzyl or phenethyl radical, in particular substituted by a nitro or hydroxyl functional group.

According to this specific embodiment, the dithiophosphoric ester of formula (F) can advantageously be a compound in which the $R_1$ group is selected from the following groups:

—$CH_2C_6H_5$
—$CH(CH_3)$ ($CO_2Et$)
—$CH(CH_3)$ ($C_6H_5$)
—$CH(CO_2Et)_2$
—$C(CH_3)$ ($CO_2Et$) (S—$C_6H_5$)
—$C(CH_3)_2$ ($C_6H_5$)
—$C(CH_3)_2CN$
or

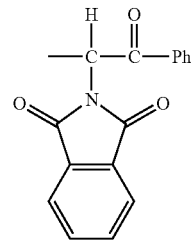

where the symbol "Et" represents an ethyl group and the symbol "Ph" represents a phenyl group.

Whatever their exact structure, the dithiophosphoric esters of formula (F) are readily accessible. They can thus be obtained in particular by reaction between $P_4S_{10}$, $K_2CO_3$ and a halogenated derivative according to a process described, for example, by Nizamov et al. in Phosphorus, Sulfur and Silicon, vol. 132, 85–100 (1998). Another route of access to compounds of formula (F) consists in reacting an alkali metal salt of a dithiophosphonic acid with a halogenated derivative. Reference may be made, on this subject, to Mastryukova et al. (Bull. Acad. Sci. USSR. Div. Chem. Sci. (Engl. Transl.), Vol. 27, 1917 (1978)).

According to another embodiment which can be envisaged, the living organic polymers (A) used in the process of the invention can also be silicone/organic hybrid copolymers obtained by a thermally activated radical polymerization preparation process of the type of those disclosed in French patent application FR 00/09722 filed by the applicant company on Jul. 25, 2000, namely silicone/organic hybrid copolymers comprising $(r)_x(u)_y SiO_{[4-(x+y)]/2}$ units in which:

x is equal to 0, 1, 2 or 3, y is equal to 0, 1, 2 or 3 with $2 \leq (x+y) \leq 3$ and y is other than 0 for at least one of the units of the hybrid copolymer, the x (r) groups, which are identical or different, each represent:
a linear or branched alkyl radical comprising 1 to 8 carbon atoms which is optionally substituted by at least one halogen, preferably fluorine, the alkyl radicals preferably being methyl, ethyl, propyl, octyl and 3,3,3-trifluoropropyl,
an optionally substituted cycloalkyl radical comprising between 5 and 8 cyclic carbon atoms, an aryl radical comprising between 6 and 12 carbon atoms which can be substituted, preferably phenyl or dichlorophenyl, an aralkyl part having an alkyl part comprising between 5 and 14 carbon atoms and an aryl part comprising between 6 and 12 carbon atoms which is optionally substituted on the aryl part by halogens, alkyls and/or alkoxyls comprising 1 to 3 carbon atoms, the y (u) groups, which are identical or different, each represent a group:

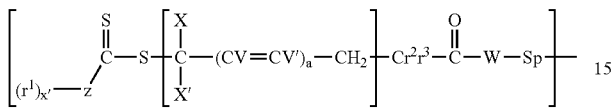

where z, which can differ from one (u) group to another, represent a carbon, sulfur, oxygen, phosphorus or nitrogen atom and/or a free valency and preferably a sulfur or oxygen atom;

x'=1, 2, 3 or 4, according to the valency of z, each of the $r^1$ groups, which are identical or different, represents:

an optionally substituted alkyl, acyl, aryl, alkene or alkynyl group, an aromatic and/or optionally substituted, saturated or unsaturated, carbonaceous ring, and/or an optionally substituted, saturated or unsaturated, heterocycle, it being possible for these groups and (hetero)cycles to be substituted by: substituted phenyl groups, substituted aromatic groups or alkoxycarbonyl, aryloxycarbonyl (—COO$r^5$), carboxyl (—COOH), acyloxy (—O$_2$C$r^5$), carbamoyl (—CON($r^5$)$_2$) cyano (—CN), alkylcarbonyl, alkylarylcarbonyl, arylcarbonyl, arylalkylcarbonyl, phthalimido, maleimido, succinimido, amidino, guanidino, hydroxyl (—OH), amino (—N($r^5$)$_2$), halogen, allyl, epoxy, alkoxy (—O$r^5$), S-alkyl or S-aryl groups, groups exhibiting a hydrophilic or ionic nature, such as alkaline salts of carbophylic acids, sulfonic acid alkaline salts, poly(alkylene oxide) (POE, POP) chains, cationic substituents (quaternary ammonium salts), the $r^5$ groups, which are identical or different, representing an alkyl or aryl group, and/or a polymer chain, a group of formula —$C_nF_{(2n+1)}$ with n between 1 and 20, a group of formula:

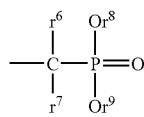

in which:

$r^6$ and $r^7$ which are identical or different, are selected from a halogen, —NO$_2$, —SO$_3r^{10}$, —NCO, —CN, —O$r^{10}$, —S$r^1$, —N($r^{10}$)$_2$, —COO$r^{10}$, —O$_2$C$r^{10}$, —CON ($r^{10}$)$_2$, —NCO($r^{10}$)$_2$ and —$C_nF_{(2n+1)}$ group with n between 1 and 20, preferably equal to 1, and $r^{10}$ representing a hydrogen atom or one of the following radicals: alkyl, alkenyl, alkynyl, cycloalkenyl, cycloalkynyl, alkaryl, aralkyl, heteroaryl or aryl optionally condensed with an aromatic or non-aromatic heterocycle; it being possible for these radicals optionally to be substituted by one or more identical or different groups selected from halogen atoms, =O, =S, —OH, alkoxy, SH, thioalkoxy, NH$_2$, mono- or dialkylamino, CN, COOH, ester, amide or $C_nF_{(2n+1)}$ and/or optionally to be interrupted by one or more atoms selected from O, S, N or P;

a heterocyclic group optionally substituted by one or more groups as defined above;

or $r^6$ and $r^7$ form, together with the carbon atom to which they are attached, a C=O or C=S group, a hydrocarbonaceous ring or a heterocycle;

and $r^8$ and $r^9$, which are identical or different, represent a group as defined above for $r^{10}$; or together form a $C_2$–$C_4$ hydrocarbonaceous chain optionally interrupted by a heteroatom selected from O, S and N;

V and V', which are identical or different, represent: H, an alkyl group or a halogen, X and X', which are identical or different, represent H, a halogen or an $R^4$, O$R^4$, O$_2$COR$^4$, NHCOH, OH, NH$_2$, NHR$^4$, N(R$^4$)$_2$, (R$^4$)$_2$N$^+$O$^-$, NHCOR$^4$, CO$_2$H, CO$_2$R$^4$, CN, CONH$_2$, CONHR$^4$ or CONR$^4$$_2$ group in which R$^4$ is selected from alkyl, aryl, aralkyl, alkaryl, alkene or organosilyl groups which are optionally perfluorinated and optionally substituted by one or more carboxyl, epoxy, hydroxyl, alkoxy, amino, halogen or sulfo groups, $r^2$ and $r^3$, which are identical or different, represent:

a hydrogen atom, an optionally substituted alkyl, acyl, aryl, alkene or alkyne group; an aromatic and/or optionally substituted, saturated or unsaturated, carbonaceous ring; an optionally substituted, saturated or unsaturated, heterocycle, an alkoxycarbonyl, aryloxycarbonyl (—COOR$^5$), carboxyl (—COOH), acyloxy (—O$_2$CR$^5$), carbamoyl (—CONR$^5$$_2$), cyano (—CN), alkylcarbonyl, alkylarylcarbonyl, arylcarbonyl, arylalkylcarbonyl, phthalimido, maleimido, succinimido, amidino, guanidino, hydroxyl (—OH), amino (—NR$^5$$_2$), halogen, allyl, epoxy, alkoxy (—OR$^5$), S-alkyl or S-aryl group, groups exhibiting a hydrophilic or ionic nature, such as alkaline salts of carbophylic acids, sulfonic acid alkaline salts, poly(alkylene oxide) chains, cationic substituents (quaternary ammonium salts), R$^5$, which are identical or different, representing an alkyl or aryl group, and/or a polymer chain, it being possible for these radicals and (hetero)cycles to be substituted by: substituted phenyl groups, substituted aromatic groups or alkoxycarbonyl, aryloxycarbonyl (—COOR$^5$), carboxyl (—COOH), acyloxy (—O$_2$CR$^5$), carbamoyl (—CONR$^5$$_2$), cyano (—CN), alkylcarbonyl, alkylarylcarbonyl, arylcarbonyl, arylalkylcarbonyl, phthalimido, maleimido, succinimido, amidino, guanidino, hydroxyl (—OH), amino (—NR$^5$$_2$), halogen, allyl, epoxy, alkoxy (—OR$^5$), S-alkyl or S-aryl groups, groups exhibiting a hydrophilic or ionic nature, such as alkaline salts of carboxylic acids, sulfonic acid alkaline salts, poly(alkylene oxide) (POE, POP) chains, cationic substituents (quaternary ammonium salts), the R$^5$ groups, which are identical or different, representing an alkyl or aryl group, and/or a polymer chain, w, which can differ from one (u) group to another, represents a divalent radical selected from —O—, —NR$^4$—, —NH— or —S—, Sp, which can differ from one (u) group to another, represents a divalent organic radical of formula —$(CH_2)_{x'''}$— in which x''' is between 1 and 20, it being possible for this radical to be substituted and/or to comprise at least one heteroatom, a=0 or 1, m≧1 and, when m>1, the repeat units with index m are identical or different.

These specific polymers, which advantageously exist in the form of a silicone/organic hybrid copolymer composed of a linear silicone backbone comprising from 1 to 300 (preferably 1 to 200) $(r)_x(u)_y SiO_{[4-(x+y)]/2}$ units and comprising in total from 1 to 50 u radicals and preferably from 1 to 10 u radicals, can be obtained according to a process which consists in reacting a mixture comprising a radical polymerization initiator, at least one ethylenically unsaturated monomer of formula

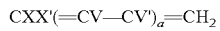

and a precursor silicone compound comprising identical or different units of formula

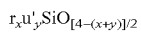

in which r, x and y have the definitions given above, and the y identical or different u' radicals are monovalent radicals of formula:

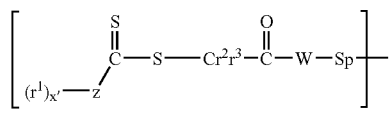

where $r^1$, x', z, $r^2$, $r^3$, w and Sp have the abovementioned definitions, the u' radicals being and are preferably selected from the following radicals:

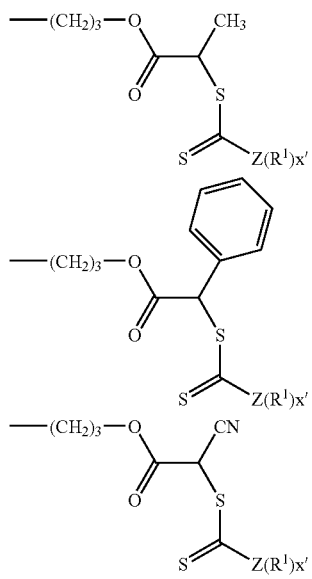

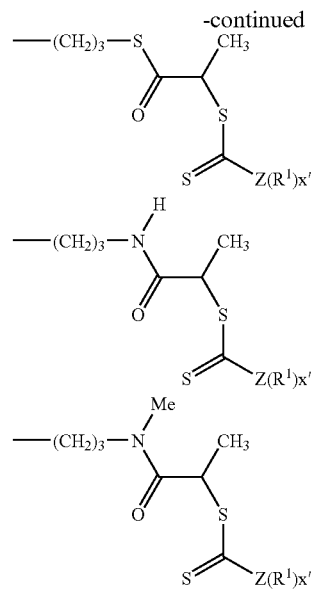

where $R^1$ represents a group corresponding to the definition of the $r^1$ group defined above.

The precursor silicone compound used in the process for the preparation of hybrid copolymers can be obtained by reaction:

(i) of a silicone comprising units of formula:

where the monovalent radical U'' is according to the following formula:

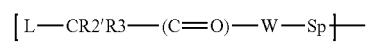

in which:

W and Sp have definitions identical to those given above,

L is an electrofuge group, for example:

Br⁻, Cl⁻, I⁻, OTs⁻, OMs⁻, $(C_6H_6)$—(C=O)—O⁻, $(CH_3)$—(C=O)—O⁻ or $(CF_3)$—(C=O)—O⁻;

(ii) with a compound selected from those of following general formulae:

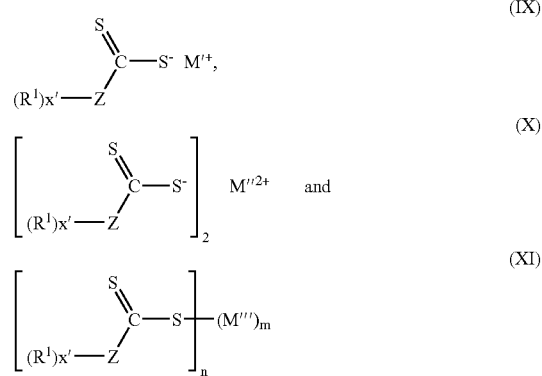

in which:
M'+ represents K+, Na+, NR$_4^+$ or PR$_4^+$, R having a definition similar to that given for R of the formula (I),
M''$^{2+}$ represents an alkaline earth metal, such as Ca$^{2+}$, Ba$^{2+}$ and SR$^{2+}$,
M''' represents Zn or Cd, m is equal to 1 or 2, n is equal to 1, 2, 3 or 4 and preferably m is equal to 1 and n is equal to 2.

This silicone of formula [lacuna] can in particular be obtained from (i) a silicone comprising units of formula: R$_x$U'''$_y$SiO$_{[4-(x+y)]/2}$, where the monovalent radical U''' has the formula: -Sp-WH, and (ii) a compound of formula:

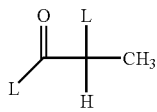

According to yet another embodiment which can be envisaged, the living organic polymers (A) used in the process of the invention can also be polymers known as "star-shaped" polymers, such as those obtained by a process of the type of that disclosed in French patent application No. 01 05144 filed on Apr. 13, 2001 by the applicant company, namely a process which comprises a stage of radical polymerization of a composition comprising:

a source of free radicals, and at least one polymer composition resulting from a living radical polymerization process and exhibiting, at the chain end, at least one reactivatable dithiocarbonyl or dithiophosphoryl functional group, and at least one crosslinking monomer, said crosslinking monomer being selected from organic compounds known to be reactive by the radical route and comprising between 2 and 10 ethylenic unsaturations and preferably 2, it being possible for this crosslinking monomer advantageously to be selected from acrylic, methacrylic, acrylamido, methacrylamido, vinyl ester, vinyl ether, diene, styrene, α-methylstyrene and allyl derivatives.

In a particularly preferred way, the living organic polymers (A) used in the process of the invention are polymers resulting from a polymerization or copolymerization process comprising at least one stage of controlled radical polymerization employing a reversible addition-fragmentation transfer agent selected from a xanthate, a dithiocarbamate or a dithioester. They are advantageously living polymers resulting from the use of transfer agents of xanthate type.

The term "source of free radicals" is understood to mean, within the meaning of the invention, in the broad sense, any compound or mixture of compounds capable of resulting in the formation of radical entities under appropriate processing conditions (thermal activation, irradiation, and the like), this compound or mixture of compounds being used under said required conditions. Preferably, the source of free radicals (B) used in the process of the present invention is a compound or mixture of compounds leading to the formation of free radicals under the effect of a heat treatment. Thus, it can, for example, be a radical polymerization initiator of conventional type. The source of free radicals (B) which is used in the process of the invention can thus in particular be selected from:

hydrogen peroxides, such as tertiary-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate or ammonium persulfate;

azo compounds, such as: 2,2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl]propionamide, 2,2'-azobis(N,N'-dimethyleneisobutyramidine) dichloride, 2,2'-azobis(2-amidinopropane) dichloride, 2,2'-azobis(N,N'-dimethyleneisobutyramide), 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl]-propionamide), 2,2'-azobis[2-methyl-N-(2-hydroxyethyl) propionamide] or 2,2'-azobis(isobutyramide) dihydrate; or redox systems comprising combinations such as, for example:

mixtures of hydrogen peroxide, alkyl peroxide, peresters, percarbonates and the like and of a compound selected from an iron salt, a titanium salt, zinc formaldehydesulfoxylate or sodium formaldehydesulfoxylate, and reducing sugars;

alkali metal or ammonium persulfates, perborates or perchlorates, in combination with an alkali metal bisulfite, such as sodium metabisulfite, and reducing sugars;

alkali metal persulfates in combination with an arylphosphinic acid, such as benzenephosphonic acid and other similar compounds, and reducing sugars.

Preferably, the source of free radicals (B) of the invention comprises a peroxide advantageously selected, if appropriate, from the compounds corresponding to one of the following formulae (I) to (IV):

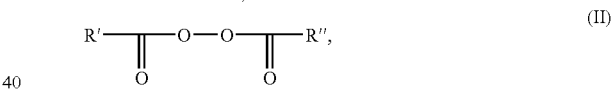

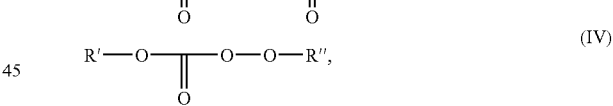

in which the R' and R'' groups, which are identical or different, represent linear or branched alkyl groups, aryl groups or aralkyl groups which are optionally substituted.

Thus, mention may in particular be made, as examples of peroxides particularly suitable as source of free radicals (B) in the process of the invention, of diisobutyryl peroxide, cumyl peroxyneodecanoate, tert-amyl peroxyneodecanoate, di(2-ethylhexyl) peroxydicarbonate, tert-butyl peroxyneodecanoate, dibutyl peroxydicarbonate, dicetyl peroxydicarbonate, dimyristyl peroxydicarbonate, tert-butyl peroxyneoheptanoate, tert-amyl peroxypivalate, didecanoyl peroxide, tert-amyl peroxy-2-ethylhexanoate, tert-butyl peroxyisobutyrate, 1,4-di(tert-butylperoxycarbo)cyclohexane, tert-butyl peroxyacetate, tert-butyl peroxybenzoate, di(tert-amyl) peroxide, tert-butyl cumyl peroxide, bis(tert-butyl) peroxide, dicumyl peroxide, dilauroyl peroxide or di(4-(tert-butyl) cyclohexyl) peroxydicarbonate.

Whatever its exact nature, the source of free radicals (B) employed according to the process of the invention is used under conditions which make possible the production of free radicals, which is generally carried out by thermal activation, that is to say by raising the temperature of the reaction medium, generally to a temperature of the order of ambient temperature (approximately 20° C.) to 200° C., preferably of 40 to 180° C., advantageously of 80 to 160° C.

The source of free radicals used can be introduced all at once into the reaction medium but it can also be introduced gradually, if appropriate portionwise or continuously.

The amount of the source of free radicals depends on its effectiveness and on its method of introduction. Advantageously, the source of free radicals used is introduced in an amount such that the amount of free radicals which it is capable of releasing is between 50 mol % and 200 mol % and preferably between 100 mol % and 150 mol %, with respect to the total molar amount of dithiocarbonyl or dithiophosphoryl functional groups carried by the combined living organic polymers present in the medium.

Another characteristic of the process of the invention is the specific use of an organic compound (C) carrying a labile hydrogen atom.

The term "labile hydrogen" will be understood, within the meaning of the invention, as meaning a hydrogen bonded to the organic compound via a a bond which is sufficiently weak for this bond to be able to result in homolytic radical cleavage.

Without wishing to be committed in any way to one particular theory, it appears possible to suggest that, in the process of the invention, free radicals RL. resulting from the source of free radicals employed react with the dithiocarbonyl functional group —S(C=S)—R (or —S(P=S)—R) of the living organic polymer to form radical entities according to the following reaction scheme:

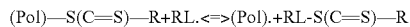

(where (Pol) denotes the polymer chain; the same reaction scheme could be presented with the —S(P=S)— functional group).

It is assumed that the organic compound carrying the labile hydrogen atom employed according to the invention (described as Org-H) acts as hydrogen transfer agent and reacts with the radical of type (Pol). thus formed, according to the reaction balance:

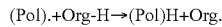

In any case, whatever the exact mechanism employed in the process of the invention, substitution of the dithiocarbonyl or dithiophosphoryl functional group(s) initially present on the living organic polymer employed by one (or more) hydrogen atom(s) is specifically obtained on conclusion of this process.

The organic compound (C) carrying a labile hydrogen atom which is employed according to the invention is preferably selected from:

secondary alcohols of formula $(HO)CH(R^I)(R^{II})$,
mercaptans of formula $R^{III}SH$,
phosphites of formula $(O=)PH(—OR^{IV})(—OR^V)$,
silanes of formula $R^{VI}R^{VII}R^{VIII}SiH$, or acetals of formula $R^{IX}CH(OR^X)(OR^{XI})$, where the $R^I$, $R^{II}$, $R^{III}$, $R^{IV}$, $R^V$, $R^{VI}$, $R^{VII}$, $R^{VIII}$, $R^{IX}$, $R^X$ and $R^{XI}$ groups each independently represent an alkyl, cycloalkyl, alkoxy, alkene, acyl, aryl, aralkyl, aralkenyl or aralkynyl radical, it being possible for these radicals optionally to be substituted.

Preferably, $R^I$, $R^{II}$, $R^{III}$, $R^{IV}$, $R^V$, $R^{VI}$, $R^{VII}$, $R^{VIII}$, $R^{IX}$, $R^X$, and $R^{XI}$ are selected from a $C_1$ to $C_8$ alkyl radical and the phenyl radical.

Advantageously, this organic compound (C) carrying a labile hydrogen atom is selected from 2-propanol, 2-butanol, 2-octanol, mercaptoethanol, diethyl phosphite, benzaldehyde dimethyl acetate and dimethylphenylsilane. More particularly, this organic compound (C) is 2-propanol.

Furthermore, the organic compound (C) carrying a labile hydrogen atom employed according to the invention is generally an organic compound capable of acting as solvent for the living polymer used which exhibits, at the chain end, at least one reactivatable dithiocarbonyl or dithiophosphoryl functional group. In this case, the amount of compound (C) employed is generally between 1 and 50000 molar equivalents and preferably between 2 and 10000 molar equivalents, with respect to the polymer (A).

In the case where this compound is not in a position to perform this role, it is preferable to carry out the reaction in the presence of a cosolvent selected, if appropriate, in particular from water, ethanol, toluene and tetrahydrofuran (THF). In this case, the amount of compound (C) employed is generally between 1 and 200 molar equivalents and advantageously between 20 and 100 molar equivalents, with respect to the polymer (A).

In the most general case, the compound (C) is employed in a proportion of 1 to 50000 molar equivalents and preferably between 2 and 10000 molar equivalents, with respect to the polymer (A).

Furthermore, in the process of the invention, the stage of bringing into contact the living polymer (A), the source of free radicals (B) and the organic compound carrying the labile hydrogen (C) is generally carried out at a temperature sufficient to make possible effective initiation of the source of free radicals but it is also generally preferable for this temperature to be less than or equal to the boiling point of the various reactants employed, otherwise there is in an inducement to carry out the process of the invention under pressure, which certainly does not compromise the efficiency of the process in the general case but is capable of being reflected in terms of an increase in processing costs.

Thus, in the most general case, at atmospheric pressure, it is preferable for this stage to be carried out at a temperature of between 0° C. and 200° C. Preferably, this processing temperature is greater than 20° C. and it is advantageously less than 180° C. Thus, this temperature can typically be between 40° C. and 160° C.

The nonlimiting examples set out below illustrate the process of the invention.

EXAMPLES

Example 1

Synthesis of a Poly(Acrylic Acid) Terminated by O-ethyl Xanthate:

7 g of acrylic acid, 28 g of ethanol, 2.02 g of S-ethylpropionyl O-ethyl xanthate and 0.48 g of azobisisobutyronitrile are introduced into a two-necked round-bottomed flask surmounted by a reflux condenser. The mixture is brought to 70° C. for 4 hours. The poly(acrylic acid) obtained has the following characteristics: Mn=2950 g/mol, Mw/Mn=1.19.

Mn is the number-average molar mass. It is measured by steric exclusion chromatography (SEC) in water with relative calibration with poly(ethylene oxide).

Mw/Mn is the polydispersity index (given by SEC). Mw is the weight-average molar mass.

Radical Reduction of Poly(Acrylic Acid) Terminated by O-ethyl Xanthate:

27.8 g of 2-propanol are added to a sample of 20 ml of poly(acrylic acid) solution from example 1. The mixture is subsequently brought to 80° C. 0.37 g of dilauroyl peroxide are introduced every two hours for 14 hours. The system is then held at this temperature for an additional 3 hours. At the end of the reaction, the crude reaction product is analyzed by SEC in water. Detection by UV radiation at 290 nm, a wavelength at which the S(C=S) group of the xanthate absorbs very strongly, shows the signal to have completely disappeared. This is characteristic of the complete reduction of the xanthate chain end.

In addition, after purification of the sample by liquid-liquid (hexane/ether) extraction, analysis of the purified poly(acrylic acid) by proton and carbon NMR spectroscopy shows the absence of the signals characteristic of the xanthate end.

Example 2

Radical Reduction of Poly(Acrylic Acid) Terminated by O-ethyl Xanthate:

27.8 g of 2-propanol are added to a sample of 20 ml of poly(acrylic acid) solution, the synthesis of which is described above. The mixture is subsequently brought to 80° C. 3.7 [lacuna] of di(p-(t-butyl)cyclohexyl) percarbonate are subsequently introduced and the reaction is carried out at this temperature for five hours. At the end of the reaction, the crude reaction product is analyzed by SEC in water. Detection by UV radiation at 290 nm, a wavelength at which the S(C=S) group of the xanthate absorbs very strongly, shows the signal to have completely disappeared. This is characteristic of the complete reduction of the xanthate chain end.

In addition, after purification of the sample by liquid-liquid (hexane/ether) extraction, analysis of the purified poly(acrylic acid) by proton and carbon NMR spectroscopy shows the absence of the signals characteristic of the xanthate end.

The invention claimed is:

1. A method for preparing a polymer which comprises a stage comprising bringing into contact:
   (A) at least one living organic polymer exhibiting, at the chain end, at least one reactivatable dithiocarbonyl or dithiophosphoryl functional group;
   (B) at least one source of free radicals; and
   (C) at least one organic compound carrying a labile hydrogen atom.

2. The method of claim 1, wherein the reactivatable dithiocarbonyl or dithiophosphoryl functional group present at the chain end on the polymer (A) employed is an —S(C=S)—R or —S(P=S)—R functional group, where R denotes:
   (i) an alkyl, haloalkyl, perfluoroalkyl, alkenyl, alkynyl, acyl, aryl, arylalkyl, arylalkenyl or arylalkynyl group, or else a carbonaceous ring or a heterocycle, or a polymer chain; or
   (ii) an —OR$^a$ radical, in which R$^a$ denotes a group selected from the group consisting of:
      alkyl, haloalkyl, perfluoroalkyl, alkenyl, alkynyl, acyl, aryl, arylalkyl, arylalkenyl, arylalkynyl, a carbonaceous ring, a heterocycle, a polymer chain and a —CR$^b$R$^c$PO(OR$^d$)(OR$^e$) group, in which:

R$^b$ and R$^c$ each represent, independently of one another, a hydrogen atom, a halogen atom, a perfluoroalkyl group, a carbonaceous ring or a heterocycle, or else an —NO$_2$, —NCO or —CN group or a group —R$^f$, —SO$_3$R$^f$, —OR$^f$, —SR$^f$, —NR$^f$R$^g$, —OOCR$^f$, —CONR$^f$R$^g$;
   R$^f$ and R$^g$ each independently denote an alkyl, alkenyl, alkynyl, aryl, aryl, arylalkyl, arylalkenyl or arylalkynyl group;
   or R$^b$ and R$^c$ form, together with the carbon to which they are attached, a C=O or C=S group, or a hydrocarbonaceous ring or a heterocycle; and
   R$^d$ and R$^e$ each represent, independently of one another, a radical having one of the definitions given above for the R$^f$ group;
   or R$^d$ and R$^e$ together form a hydrocarbonaceous chain comprising from 2 to 4 carbon atom optionally interrupted by an —O—, —S— or —NR$^h$-group, where R$^h$ has one of the definitions given above for the R$^f$ group; or
   (iii) an —NR$^i$R$^j$ group, where:
      R$^i$ and R$^j$ represent, independently of one another, a radical selected from the group consisting of an alkyl, haloalkyl, alkenyl, alkynyl, acyl, ester, aryl, arylalkyl, arylalkenyl or arylalkynyl group and a carbonaceous ring; or
      R$^i$ and R$^j$ together form a hydrocarbonaceous chain comprising from 2 to 4 carbon atom optionally interrupted by an —O—, —S— or —NR$^H$-group, where R$^H$ corresponds to one of the definitions given above for the R$^f$ group, said hydrocarbonaceous chain forming a 5-membered ring with nitrogen to which R$^i$ and R$^j$ are attached.

3. The method of claim 2, wherein R denotes a —NR$^i$R$^j$ group (iii), wherein the R$^i$ and R$^j$ radicals induce an electron-withdrawing effect or a delocalization effect with regard to the electron density of the nitrogen atom to which they are bonded.

4. The method of claim 1, wherein the living organic polymer (A) is a polymer resulting from a process employing a living radical polymerization using at least one reversible addition-fragmentation transfer agent of dithioester, xanthate, dithiocarbamate, thioether-thione, trithiocarbonate or dithiophosphoric ester type.

5. The method of claim 4, wherein the polymer (A) results from a polymerization or copolymerization process comprising at least one stage of controlled radical polymerization employing a reversible addition-fragmentation transfer agent selected from the group consisting of a xanthate, a dithiocarbamate and a dithioester.

6. The method of claim 1, wherein the source of free radicals (B) employed comprises a peroxide selected from the group consisting of the compounds having one of the following formulae (I) to (IV):

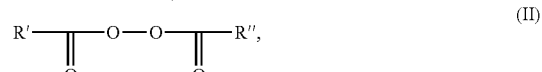

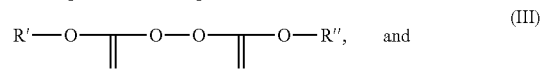

-continued

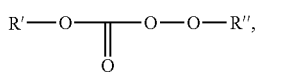

(IV)

wherein the R' and R' groups are identical or different and represent linear or branched alkyl groups, aryl groups or aralkyl groups which are substituted or non-substituted.

7. The method of claim 5, wherein the source of free radicals (B) employed comprises a peroxide selected from the group consisting of diisobutyryl peroxide, cumyl peroxyneodecanoate, tert-amyl peroxyneodecanoate, di(2-ethylhexyl) peroxydicarbonate, tert-butyl peroxyneodecanoate, dibutyl peroxydicarbonate, dicetyl peroxydicarbonate, dimyristyl peroxydicarbonate, tert-butyl peroxyneoheptanoate, tert-amyl peroxypivalate, didecanoyl peroxide, tert-amyl peroxy-2-ethylhexanoate, tert-butyl peroxyisobutyrate, 1,4-di(tert-butylperoxycarbo)cyclohexane, tert-butyl peroxyacetate, tert-butyl peroxybenzoate, di(tert-amyl) peroxide, tert-butyl cumyl peroxide, bis(tert-butyl) peroxide, dicumyl peroxide, dilauroyl peroxide and di(4-(tert-butyl) cyclohexyl) peroxydicarbonate.

8. The method of claim 1, wherein the source of free radicals (B) is introduced in an amount such that the amount of free radicals which it is capable of releasing is between 50 mol % and 200 mol % with respect to the total molar amount of dithiocarbonyl or dithiophosphoryl functional groups carried by the combined living organic polymers (A) employed.

9. The method of claim 1, wherein the organic compound (C) carrying a labile hydrogen is selected from the group consisting of:
secondary alcohols of formula $(HO)CH(R^{I})(R^{II})$,
mercaptans of formula $R^{III}SH$,
phosphites of formula $(O=)PH(-OR^{IV})(-OR^{V})$,
silanes of formula $R^{VI}R^{VII}R^{VIII}SiH$, and
acetals of formula $R^{IX}CH(OR^{X})(OR^{XI})$,
where the $R^{I}$, $R^{II}$, $R^{III}$, $R^{IV}$, $R^{V}$, $R^{VI}$, $R^{VII}$, $R^{VIII}$, $R^{IX}$, $R^{X}$ and $R^{XI}$ groups each independently represent an alkyl, cycloalkyl, alkoxy, alkene, acyl, aryl, aralkyl, aralkenyl or aralkynyl radical, these radicals being substituted or non-substituted.

10. The method of claim 1, wherein the compound (C) is employed in a proportion of 1 to 50 000 molar equivalents with respect to the polymer (A).

11. The method of claim 10, wherein compound (C) is employed in a proportion of 2 to 10 000 molar equivalent with respect to polymer (A).

12. The method of claim 1, wherein the stage of bringing into contact the living polymer (A), the source of free radicals (B) and the organic compound carrying the labile hydrogen (C) is carried out at a temperature of between 0° C. and 200° C.

* * * * *